(12) United States Patent
Dupire et al.

(10) Patent No.: US 6,699,516 B1
(45) Date of Patent: Mar. 2, 2004

(54) BREWING METHOD AND INSTALLATION

(75) Inventors: Stephane Dupire, Orp-le-Grand (BE); Jacques Hermia, Walhain (BE); Jean-Yves Macron, Louvain-la-Neuve (BE); Jacques Meurens, Richelle-Vise (BE); Georges Rahier, Liege (BE)

(73) Assignees: Interbrew Societe Anonyme (BE); Krontec Societe Anonym (LU)

( * ) Notice: Subject to any disclaimer, the term of this patent is extended or adjusted under 35 U.S.C. 154(b) by 1072 days.

(21) Appl. No.: 08/751,035

(22) PCT Filed: Jun. 17, 1993

(86) PCT No.: PCT/BE93/00035

§ 371 (c)(1),
(2), (4) Date: Apr. 10, 1995

(87) PCT Pub. No.: WO93/25656

PCT Pub. Date: Dec. 23, 1993

Related U.S. Application Data

(63) Continuation of application No. 08/347,393, filed as application No. PCT/BE93/00035 on Jun. 17, 1993, now abandoned.

(30) Foreign Application Priority Data

Jun. 18, 1992 (BE) .............................................. 9200572

(51) Int. Cl.$^7$ .............................................. C12C 11/00
(52) U.S. Cl. .............................. 426/16; 426/18; 426/29; 426/278; 426/524
(58) Field of Search .............................. 426/16, 18, 29, 426/524; 99/278; 435/93

(56) References Cited

U.S. PATENT DOCUMENTS

| | | | | |
|---|---|---|---|---|
| 3,048,489 A | * | 8/1962 | Blum .......................... | 426/29 |
| 3,161,522 A | * | 12/1964 | Compton .................... | 426/436 |
| 4,207,345 A | * | 6/1980 | Van Gheluwe et al. ....... | 426/11 |
| 4,542,683 A | * | 9/1985 | Wilkinson ................. | 99/277.2 |
| 4,816,147 A | | 3/1989 | Eyben et al. | |
| 5,242,694 A | * | 9/1993 | Reuther ....................... | 426/16 |

FOREIGN PATENT DOCUMENTS

| | | | |
|---|---|---|---|
| BE | 457667 | * | 11/1944 |
| CH | 457334 | * | 8/1968 |
| DE | 657114 | * | 12/1935 |
| DE | 1642743 | * | 5/1971 |
| DE | 2941698 | * | 4/1981 |
| DE | 3344716 | * | 6/1985 |
| GB | 1321009 | * | 6/1973 |

OTHER PUBLICATIONS

C. L. Barnhart, Ed. The American College Dictionary, Random House New York, 1970, p 452.*

H. M. Broderick, The Practical Breuer, 2$^{nd}$ Ed., Master Breuer Assoc. of the Americas, Wisconsin, 1977, pp. 64–67, 92–95, 126–127 and 142–143.*

R. C. Weast, Ed., CRC Handbook of Chemistry & Physics, The Chemical Rubber Co., Cleveland, 1972, F–133.*

* cited by examiner

Primary Examiner—Curtis E. Sherrer
(74) Attorney, Agent, or Firm—Bachman & LaPointe, P.C.

(57) ABSTRACT

Brewing method in which a suspension of cereals having undergone traditional mashing is boiled in the same kettle as that in which mashing is carrier out, with no hops present. Filtration in the method of the invention is carried out using a thin filter bed, i.e. a filter bed with a thickness between 20 mm and 60 mm, preferably on the order of 40 mm. The method is preferably carried out in an installation that includes a mash tub and at least one and preferably two or three kettles in which mashing and boiling takes place, the kettles being followed by a filter and preferably by a buffer tank and then by a cooler.

15 Claims, 2 Drawing Sheets

BREWING METHOD AND INSTALLATION

The instant application is a continuation of U.S. patent application Ser. No. 08/347,393, filed Jan. 10, 1995, entitled BREWING METHOD AND INSTALLATION, by Stephane Dupire et al., now abandoned which is a 371 of PCT/BE93/00035 filed Jun. 17, 1993.

BACKGROUND OF THE INVENTION

1. Field of the Invention

The present invention concerns an improved brewing method the benefits of which include substantial time savings in the production of the wort. It also concerns brewing hall installations for implementing this method.

2. Description of the Prior Art

The function of the brewing hall in the brewing process is to produce from water, cereals that are optionally malted and hops a wort which is then fermented.

This stage of the process is discontinuous and is made up of the following five successive operations:

1 Mashing: during this phase the starchy materials in the cereals are converted by enzyme action into elements that can be fermented and proteins are broken down into peptides and amino acids.
2 Filtration: the suspension obtained is then filtered. The insoluble phase, or draff, is washed and optionally pressed to obtain the maximum possible extract from it. The liquid phase, or wort, is boiled.
3 Boiling: the purpose of boiling the wort is to inactivate the enzymes, to sterilize the wort, to coagulate the proteins, to eliminate excess water and unwanted volatile substances and to release the bitter materials present in the hops added at this stage of the process.
4 Clarification of the wort: the boiled wort contains coagulated proteins and hop draff. It is necessary to eliminate this insoluble phase, which is a relatively simple matter using a static or centripetal (whirlpool) settling tank.
5 Cooling: the boiled wort is then cooled to the fermenting temperature. During cooling protein fractions combine with polyphenols to produce a fine precipitate which has no harmful effect on the beer.

To carry out these operations the brewing hall is equipped with a boiler for gelatinizing unmalted cereals such as rice and corn, one or two mashing tanks for malted cereals, a filtration system, one or two brewing kettles, a system for separating the insoluble phase and a cooler.

This design of brewing hall does not make optimum use of the existing plant and makes it difficult to modify the types of operations carried out.

Production is limited in particular by non-optimum use of the brewing kettles. The investment and operating overheads of the installation and regulation and automation of the brewery would benefit from optimization.

The prior art includes various proposals for remedying these drawbacks.

Document GB-A-1 321 009 describes a method of continuous production of wort which involves complete modification of existing brewing halls and has never been adopted for industrial production of beer.

Document DE-A-2 941 698 describes a method intended to reduce the duration of the brewing process by using a cyclone sorting step after the milling of the cereals to separate a starch-rich fraction and a fraction rich in protein but low in starch. Only the starch-rich fraction is used for brewing, the other fraction being put to some other use. This preliminary step takes time, consumes energy and does not make completely cost-effective use of the materials for brewing.

Document U.S. Pat. No. 3,048,489 is directed to reducing the duration of the brewing operations and describes a method including a filtration step after boiling the wort using a single kettle.

The document states that the malt must be very finely ground, to a value of not less than 60 mesh and preferably 100 mesh.

SUMMARY OF THE INVENTION

The invention is directed to avoiding the aforementioned drawbacks of prior art installations by offering greater flexibility of operation and use. In particular, it allows the production of several different types of beer (for example, preparation of a wort for top fermentation and of another wort for bottom fermentation) and more generally, through improved use of the plant, reduces costs and facilitates operation.

In the method of the invention, the suspension of cereals that have undergone conventional mashing is boiled in the same kettle, in the absence of hops, after which the wort (suspension) obtained is pumped onto a filter.

The method of the invention uses a thin filter bed (between 20 mm and 100 mm thick, preferably in the order of 40 mm thick), thereby differing from traditional methods which use filter beds in the order of 30 cm thick. The advantage of this is that the filtering time is shorter, but still in accordance with the laws of operation, and the wort obtained has adequate clarity.

After filtration the cake composed of draff is pressed and sparged (washed) and the wort is cooled for subsequent conventional treatment, possibly after passing through a buffer tank.

Because the hops are not added during the mashing-boiling operation, they are introduced in the isomerized form either during fermentation or during storage of the beer.

Hop extract can also be added during bottling or canning.

The cereals employed are not separated into various fractions and are put into suspension in the form of a flour. A non-negligible proportion of this flour (in the order of 30% to 40%) has a particle size such that it cannot pass through the 253 $\mu$m screens which are the norm in brewing.

This particle size can be obtained using a hammer grinder with an outlet screen mesh size in the order of 1 mm.

It has been found advantageous to include in the method an intermediate step between boiling and filtration in which the temperature is reduced to a value in the order of 70° C. by adding cold water to the wort or by passing the latter through a heat exchanger. The benefit of this operation is that it reduces the concentration of DMS (dimethylsulfide) and of dextrins at the fermentation stage.

Other features and advantages of the invention will emerge from the following description of one preferred embodiment of the invention.

BRIEF DESCRIPTION OF THE APPENDED DRAWINGS

DETAILED DESCRIPTION OF THE PREFERRED EMBODIMENT(S)

The invention will be described in more detail with reference to a preferred embodiment of the invention shown in the figures. Various operative details and features specific to the process of the invention are described by way of non-limiting illustrative example only.

Figure 1:
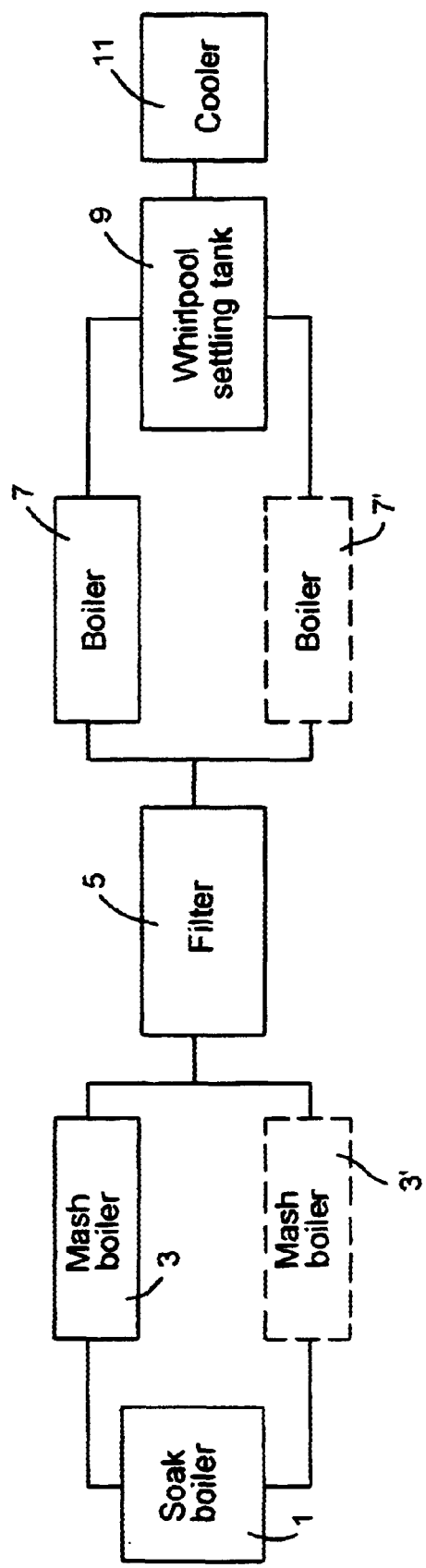
FIG. 1 is a diagram showing a traditional brewing hall.

Referring to FIG. 1, in the prior art, the boiler 1 is used to gelatinize the unmalted cereals which are then transferred to one or two mash tubs 3 and 3' for the malted cereals. On the outlet side of a system of filters 5 the wort is boiled in one or two brewing kettles 7 and 7'. After passing through a separating system 9 for separating it from the insoluble phase (a settling tank or whirlpool, for example), the wort is cooled to the fermentation temperature in a cooler 11.

Figure 2:
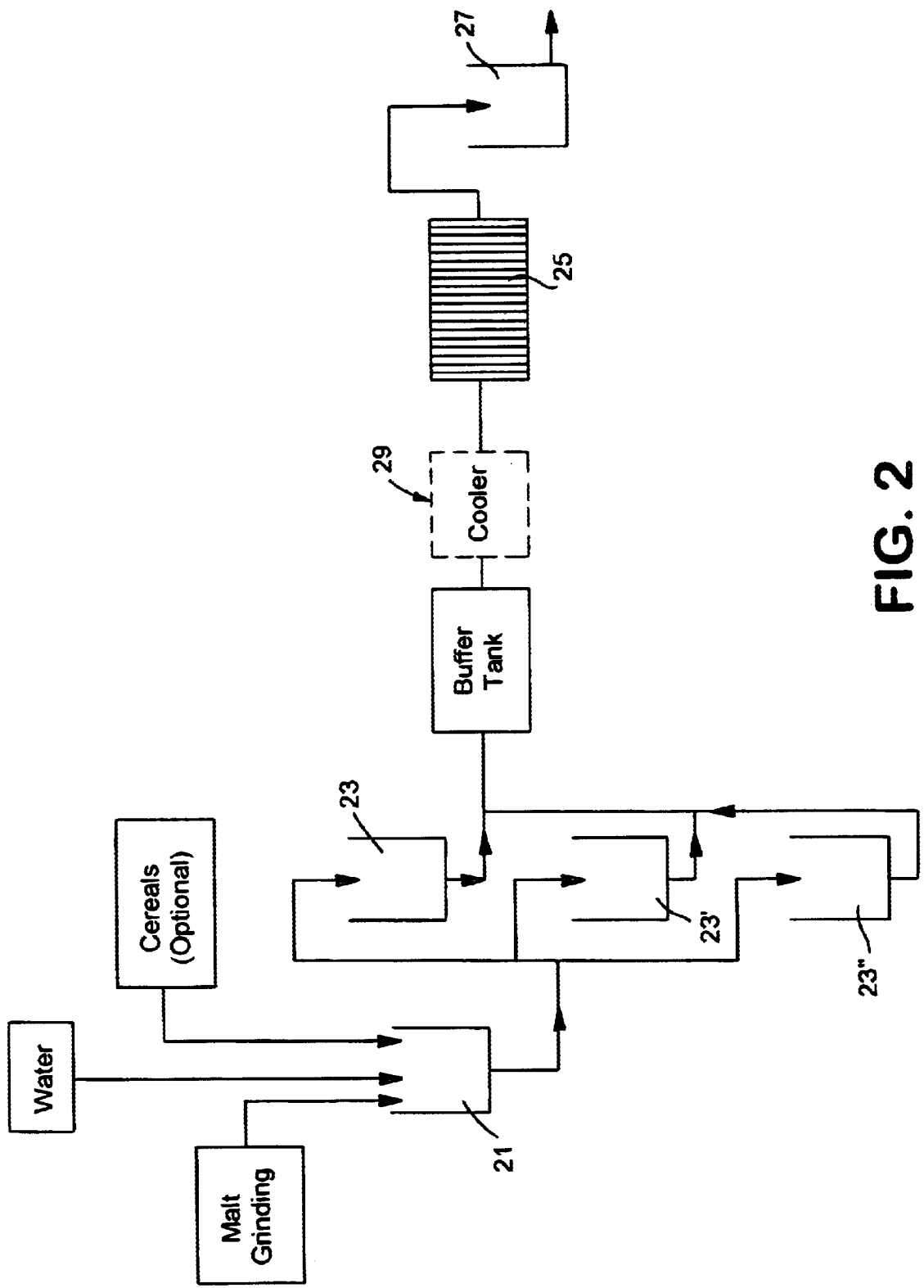
FIG. 2 is a block diagram showing the design of an installation for implementing the method of the invention.

FIG. 2 is a diagram of the installation of the invention. The installation includes a mash tub 21 and at least one (preferably two or three) kettles 23, 23', 23" in which mashing and boiling are carried out. These kettles are followed by a filter 25 and preferably a buffer tank and then a cooler 27.

The method of the invention uses a thin filter bed, i.e. a filter bed having a thickness in the order of 40 mm.

The filter is preferably constructed as disclosed in document U.S. Pat. No. 4,816,147 in which a partially preferred filter, called the 2001 filter, is disclosed.

The cereal fed to the mash tub 21 is obtained by grinding small quantities of barley malt to which are added either raw grain which cannot be converted by the barley malt enzymes because of its high gelatinization temperature or a suspension of malt flour which must be boiled to give the beer the proper taste, and which can be obtained from a hammer grinder with a screen mesh size in the order of 1 mm, for example.

To reduce the concentration of dextrins and DMS it may be preferable to cool the wort to a temperature in the order of 70° C. on the upstream side of the filter 25. This is indicated by the arrow 29 in FIG. 2.

The capacity of the mashing-boiling kettles is naturally adapted to suit the operating conditions. It is also to be understood that the use of a plurality of kettles of this type rather than a single kettle means that the individual capacity of each kettle is smaller than the capacity required for a single kettle.

An installation as shown including three mashing-boiling kettles is preferable because of its greater flexibility of use, in particular for producing more than one type of beer.

The design of the installation makes better use of the brewing kettles and reduces the total time necessary for brewing and consequently production can be increased by 20% to 30%.

Some ratios of the natural constituents of the wort obtained by the new method may be different from those obtained with the traditional method.

Various details of operation are discussed in detail hereinafter from this point of view.

Gelatinization of the starch: the starch may gelatinize during boiling, which can cause problems during final clarification of the beer. This phenomenon is substantially reduced by using a shorter boiling time and by using a fine milling for mashing, which can easily be produced by a hammer grinder.

Elimination of unwanted volatile materials: this is uneasier because of the higher concentration of extracts in the wort during boiling. Although the concentration of these substances is higher at the end of boiling, the dilution by the draff sparging (washing) water substantially reduces the concentration of unwanted substances. Dimethylsulfide can be eliminated by stripping when the wort enters the buffer tank or by using an appropriate stirring device in a mashing-boiling kettle with a high pumping effect. Inappropriate taste: the flakes of cereal heated to boiling point could release inappropriate substances into the wort. Tasting tests have shown that this does not produce the wrong flavor.

Difficult filtering: precipitation of proteins causes an increase in the upper dough which makes it almost impossible to carry out filtration in the filter-kettle equipment which is the norm in brewing at present. Filtration of a brew prepared using a fine wort and employing a thin filter bed in an appropriate filter device, does not cause any problem.

Addition of hops: to prevent a substantial reduction of isomerization efficiency in the brewing kettle due to phenomena of adsorption on the insoluble phase and the flakes of cereal, the beer is made bitter by adding pre-isomerized extracts during fermentation or during storage and hop extract can be added before clarification of the beer or at the bottling or canning stage, to input specific flavors.

Experimental Results

The times to produce wort ready for fermentation have been compared for a "Pils" type beer; a time of 360 minutes was measured for the traditional process, representing 120 minutes for mashing, 90 minutes for filtration, 90 minutes for boiling and 60 minutes for treatment of the wort. The duration for the new process was reduced to 270 minutes, representing 120 minutes for mashing, 60 minutes for boiling and 90 minutes for filtration. This is a saving of more than 20% compared to the traditional method.

The quality of the wort before fermentation was in accordance with the applicable standards for the reference Pils type beer (100% malt). The results are summarized in Table 1.

TABLE 1

Analysis of wort before fermentation

|  | Conventional method | New method |
|---|---|---|
| Density (° Plato) | 13.53 | 14.01 |
| pH | 5.47 | 5.51 |
| Color (° EBC) | 9.4 | 9.1 |
| Polyphenols (ppm) | 218 | 244 |
| Amino acids (ppm) | 1946 | 1930 |
| Fatty acids (ppm) | 12 | 31 |
| DMS (ppb) | 15 | 35 |
| Dextrin | 508 | 538 |

On fermentation these worts produced very similar beers. Table 2 summarizes the analysis results.

TABLE 2

Beer analysis

|  | Traditional beer | New beer |
|---|---|---|
| Primitive extract (° Plato) | 11.9 | 12.07 |
| Final extract (° Plato) | 2.55 | 2.62 |
| Attenuation (%) | 77.7 | 77.9 |
| Alcohol content (% vol) | 5.0 | 5.0 |
| pH | 4.3 | 4.3 |
| Color (° EBC) | 25.6 | 26.3 |
| Total nitrogen (ppm) | 827 | 810 |

TABLE 2-continued

<u>Beer analysis</u>

|  | Traditional beer | New beer |
|---|---|---|
| Polyphenols (ppm) | 101 | 98 |
| Higher alcohol (ppm) | 79 | 78 |
| Esters (ppm) | 24 | 22 |
| Diacetyl (ppb) | 18 | 13 |
| DMS (ppb) | 67 | 75 |

To highlight the benefit of operating conditions specific to the process of the invention, the effects of wort flour size on the total duration of filtration-washing were compared for a filter bed thickness of 40 mm.

The comparative scales for the system of measurement were broadly as follows:

1. Measurements made on a conventional five-screen apparatus known under the name of Plansichter, having the following respective screen sizes.

| PLANSICHTER | MESH |
|---|---|
| Screen 1 | 1.24 mm |
| 2 | 1.01 |
| 3 | 0.547 |
| 4 | 0.253 |
| 5 | 0.152 |

2. "Mesh" and "micron" scales.
   60 mesh 250 μm
   100 mesh 150 μm

The experimental percentage distribution by weight for the Plansichter measurement for mesh diameters of 2 mm and 0.8 mm was as follows:

| | Grinder screen diameter | | | | | | |
|---|---|---|---|---|---|---|---|
| Plansichter | 2 mm | 2 mm | 2 mm | 2 mm | 0.8 mm | 0.8 mm | 2 mm |
| 1 | 0.1 | 0 | 0 | 0 | 0 | 0 | 0 |
| 2 | 0.5 | 0.3 | 0.6 | 0.2 | 0 | 0 | 0.3 |
| 3 | 10.5 | 9.9 | 14.3 | 6.2 | 2.1 | 1.4 | 10.2 |
| 4 | 35.9 | 33.7 | 39.2 | 24.0 | 34.3 | 20.8 | 34.2 |
| 5 | 38 | 39.8 | 42.6 | 38.5 | 49.5 | 41.5 | 18.6 |
| 6 | 15 | 22.3 | 8.3 | 21.0 | 14.1 | 36.3 | 36.7 |

A 0.5 mm diameter wort and a 2 mm diameter wort with the following distribution were compared:

| | 0.5 mm ⌀ wort | 2 mm ⌀ wort |
|---|---|---|
| 1 | 0 | 0 |
| 2 | 0.1 | 0.3 |
| 3 | 2 | 10.2 |
| 4 | 20.6 | 34.2 |
| 5 | 25.4 | 18.6 |
| base | 51.9 | 36.7 |

Total Duration of Filtration-washing Operation

| | 0.5 mm ⌀ | | 2 mm ⌀ |
|---|---|---|---|
| filling | 183 | pressure 0.5 bar | 195 |
| filtration | 1977 | | 637 |
| first pressing | 575 | | 110 |
| washing | 3693 | | 1612 |
| final pressing | 822 | | 988 |
| total | 7200 sec | | 3000 sec |

What is claimed is:

1. A method for producing a boiled wort adapted for use in making beer and other fermented malted beverages from water, malted cereals, and optionally unmalted cereals, said method comprising:
   grinding said malted cereals so as to obtain an unseparated flour possessing a particle size so that from about 60% to about 70% of said flour passes through a 60 mesh screen;
   mashing said unseparated flour in a kettle to obtain a suspension;
   boiling said suspension in the same kettle to form a boiled wort; and
   filtering said boiled wort, said filtering step comprising the step of pumping said boiled wort through a filter to eliminate an insoluble phase from said boiled wort.

2. A method according to claim 1 wherein said filtering step comprises pumping said boiled wort through a thin filter bed having a thickness between 20 mm and 100 mm.

3. A method according to claim 2 wherein said filtering step comprises pumping said boiled wort through a thin filter bed having a thickness of about 40 mm.

4. A method according to claim 1 wherein hops are introduced in isomerized form during a fermentation step or during a storage step.

5. A method according to claim 1 wherein said method includes an intermediate step between said boiling and said filtering step of cooling the wort to a temperature of about 70° C.

6. A method according to claim 5 wherein said cooling is effected in said intermediate step by adding cold water to the wort.

7. A method according to claim 5 wherein said cooling is effected in said intermediate step by passing the wort through a heat exchanger.

8. A method according to claim 1 wherein hop extracts are added at a bottling or a canning stage.

9. A method according to claim 1 wherein hop extracts are added before final clarification of the beer.

10. A method for producing a boiled wort adapted for use in making beer and other fermented malted beverages from water, malted cereals, and optionally unmalted cereals, said method comprising the following steps:
   grinding said malted cereals so as to obtain an unseparated flour possessing a particle size so that from 30% to 40% of said flour possesses a particle size which prevents it from passing through a screen of 253 μm;
   mashing said unseparated flour in a kettle to obtain a suspension;
   boiling said suspension in the same kettle to form a boiled wort; and
   filtering said boiled wort, said filtering step comprising the step of pumping said boiled wort through a filter to eliminate an insoluble phase from said boiled wort.

11. The method according to claim 10, wherein said filtering step comprises pumping said boiled wort through a filter bed having a thickness between 20 mm and 100 mm.

12. The method according to claim 10, further including reducing the concentration of DMS and dextrins at a subsequent fermentation stage by cooling said boiled wort after said boiling step and before said filtering step.

13. The method according to claim 12, wherein said cooling step comprises cooling said boiled wort to a temperature on the order of 70° C.

14. The method according to claim 1 further comprising:
mixing said unseparated flour with unmalted cereals.

15. A method for producing a boiled wort adapted for use in making beer and other fermented malted beverages, said method comprising the steps of:

grinding said malted cereals so as to obtain an unseparated flour possessing a particle size so that from 30% to 40% of said flour possesses a particle size which prevents it from passing through a screen of 253 $\mu$m;

mixing said unseparated flour with unmalted cereals;

mashing said unseparated flour mixed with said unmalted cereals in a kettle to obtain a suspension;

boiling said suspension in the same kettle to form a boiled wort; and filtering said boiled wort, said filtering step comprising the step of pumping said boiled wort through a filter to eliminate an insoluble phase from said boiled wort.

* * * * *